(12) United States Patent
Baer et al.

(10) Patent No.: US 6,184,601 B1
(45) Date of Patent: *Feb. 6, 2001

(54) THERMALLY RESPONSIVE PROTECTION APPARATUS

(75) Inventors: Mark E. Baer, Trout Rim, PA (US); Gary C. Berray, Port Crane; James F. Streeter, Oxford, both of NY (US)

(73) Assignee: Shop Vac Corporation, Williamsport, PA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/256,562

(22) Filed: Feb. 24, 1999

(51) Int. Cl.[7] .................................................. H02K 11/00
(52) U.S. Cl. ............................................................ 310/68 C
(58) Field of Search ................................... 310/68 C, 71; 337/180, 181, 187, 227, 237, 252

(56) References Cited

U.S. PATENT DOCUMENTS

| | | | |
|---|---|---|---|
| 841,849 | 1/1907 | Cook | 337/415 |
| 1,001,152 | 8/1911 | Lawrence | 361/25 |
| 1,744,508 | 1/1930 | Sayre | 337/414 |
| 2,759,065 | * 8/1956 | Moeller | 337/252 |
| 2,767,285 | 10/1956 | Kosak, Jr. | 200/142 |
| 2,844,782 | 7/1958 | Wentworth | 318/472 |
| 3,600,633 | 8/1971 | Bellis | 317/13 R |
| 3,872,415 | 3/1975 | Clarke | 337/140 |
| 3,913,051 | * 10/1975 | Manker et al. | 337/279 |
| 4,034,265 | 7/1977 | DuRocher | 361/25 |
| 4,132,913 | 1/1979 | Lautner et al. | 310/68 |
| 4,164,726 | * 8/1979 | Weibe | 337/215 |
| 4,230,961 | 10/1980 | Calfo et al. | 310/68 R |
| 4,267,542 | * 5/1981 | Weiner | 337/227 |
| 4,486,736 | 12/1984 | Olson et al. | 337/409 |
| 4,499,517 | 2/1985 | Lisauskas | 361/24 |
| 4,564,775 | 1/1986 | Mazzorana | 310/62 |
| 4,658,321 | 4/1987 | Lindner | 361/25 |
| 4,789,800 | 12/1988 | Zimmermann | 310/68 C |
| 4,897,584 | 1/1990 | Grützmacher et al. | 318/471 |
| 4,914,329 | 4/1990 | Ottersbach | 310/68 C |
| 5,097,168 | * 3/1992 | Takekoshi et al. | 310/68 R |
| 5,107,387 | * 4/1992 | Orton | 361/33 |
| 5,168,415 | 12/1992 | Osuga | 361/28 |
| 5,221,914 | 6/1993 | Ubukata | 337/13 |
| 5,600,193 | 2/1997 | Matsushima et al. | 310/68 |
| 5,600,575 | * 2/1997 | Anticole | 364/557 |
| 5,687,823 | 11/1997 | Nakagawa et al. | 192/84.961 |
| 5,818,320 | * 10/1998 | Matsuoka | 337/198 |
| 5,886,612 | * 3/1999 | Beckert et al. | 337/197 |
| 5,982,270 | * 11/1999 | Wolfe, Jr. et al. | 337/401 |

FOREIGN PATENT DOCUMENTS

| | | | |
|---|---|---|---|
| 0 511 776 A2 | 11/1992 | (EP) . | |
| 0 511 776 A3 | 8/1993 | (EP) . | |
| 2673323 | * 8/1992 | (FR) | 337/227 |

OTHER PUBLICATIONS

International Search Report dated Noc. 5, 1999.

* cited by examiner

Primary Examiner—Clayton LaBalle
(74) Attorney, Agent, or Firm—Marshall, O'Toole, Gerstein, Murray & Borun

(57) ABSTRACT

A thermal protection mechanism for electric motors includes a pair of spaced contacts secured to an electrically insulated carrier. The contacts are engaged with a fusible electrically conductive pin made of solder that interposes along a current path to the windings of a motor. A thermal overload conditions causes the pin to fuse, thereby terminating operation of the motor.

11 Claims, 4 Drawing Sheets

THERMALLY RESPONSIVE PROTECTION APPARATUS

TECHNICAL FIELD

The present invention relates generally to electric motors, and more particularly, to a thermally responsive protection apparatus for such a motor.

BACKGROUND ART

Electric motors often include mechanisms that terminate operation of the motor in response to thermal overload conditions that could result in permanent damage to the motor or associated equipment. A thermal overload, such as an excessively high winding or rotor temperature, may occur as a result of a locked rotor, a high mechanical load, a supply overvoltage, a high ambient temperature, or some combination of these conditions.

Thermal cut-outs (TCOs) are one well-known mechanism that may be used to protect an electric motor. Conventional TCOs are based on a thermally responsive element that fuses in response to a thermal overload condition, thereby interrupting the flow of electrical power to the protected apparatus. One typical approach uses a spring-loaded contact pin or lead that is held in electrical connection with an opposing contact by a fusible material such as solder. Another typical approach uses one or more springs, which are independent from a pair of electrical contacts and which urge the electrical contacts apart when a stop material melts in response to an elevated temperature. Both of these approaches are undesirable because the TCO typically includes a complex arrangement of springs and contact elements that are mounted in a housing. Thus, these approaches are inherently costly, and do not allow for the direct inspection of the TCO because the fusible material and contact conditions are not usually visible through the housing.

Conventional current fuses may also be used to protect an electric motor from thermal overload conditions. Current fuses, such as cartridge style fuses, may be serially interposed in the current path of the motor windings. Typically, the fuse is selected so that it interrupts the power supplied to the motor windings at a predetermined current level that could result in a dangerously high winding temperature. Current fuses are undesireable as a thermal overload protection mechanism because they are substantially operationally unresponsive to the actual thermal conditions within a motor, which could result in operation of the motor at a dangerously high winding temperature or a premature termination of the motor operation at a safe winding temperature. For example, a current fuse may prematurely terminate the operation of a motor in response to transient winding currents that would be insufficient to heat the thermal mass of the motor to cause a dangerously high winding temperature.

SUMMARY OF THE INVENTION

In accordance with one aspect of the present invention, a protection apparatus for an electric motor includes a pair of electrical contacts that are spaced apart and secured to an electrically insulating carrier. A fusible electrically conductive pin is engaged with the contacts to provide an electrical path between them. The pin is responsive to a thermal overload condition in the motor such that the pin fuses and interrupts the electrical path between the contacts.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
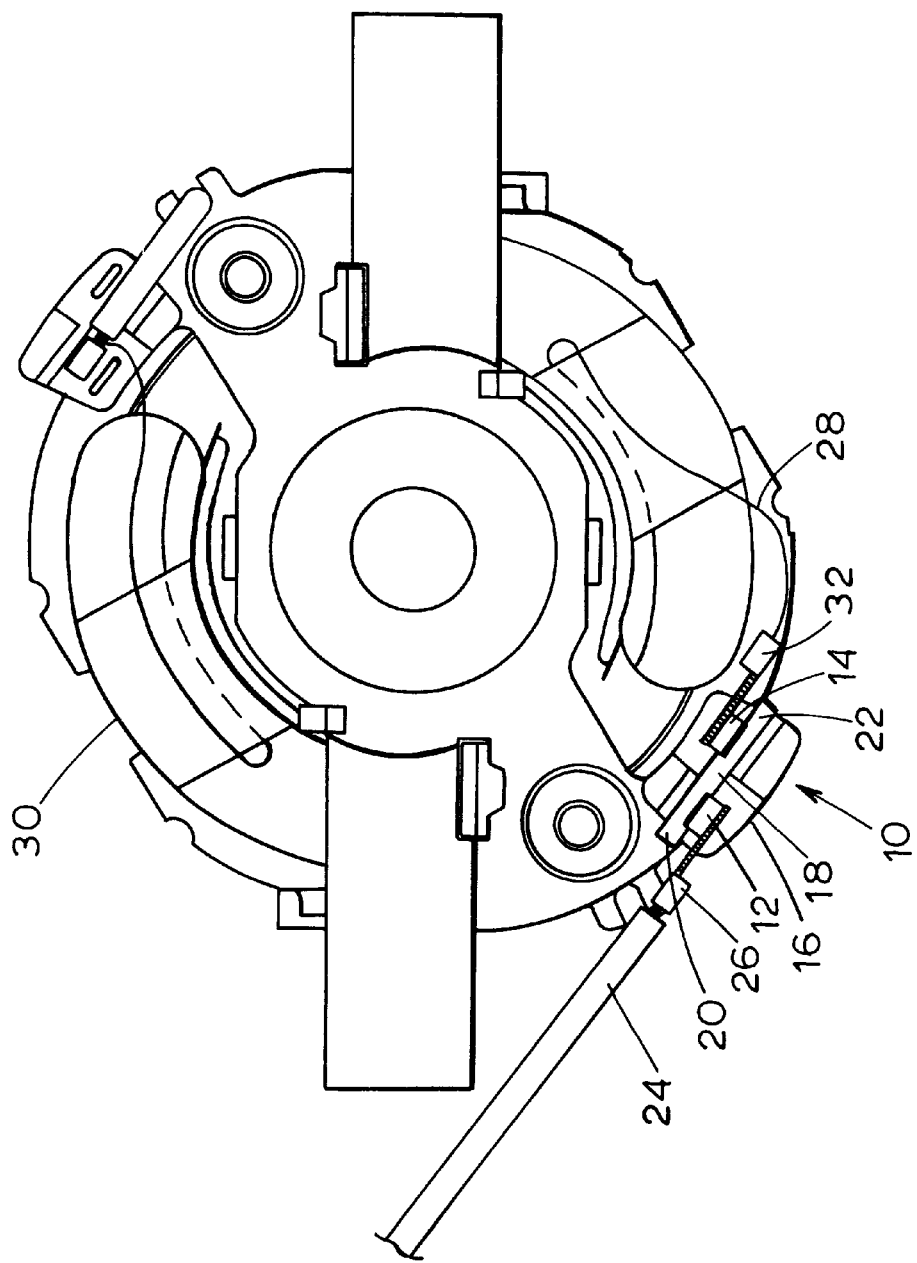
FIG. 1 is a plan view of an electric motor assembly incorporating a thermally responsive protection apparatus according to one embodiment of the present invention.
Figure 2:
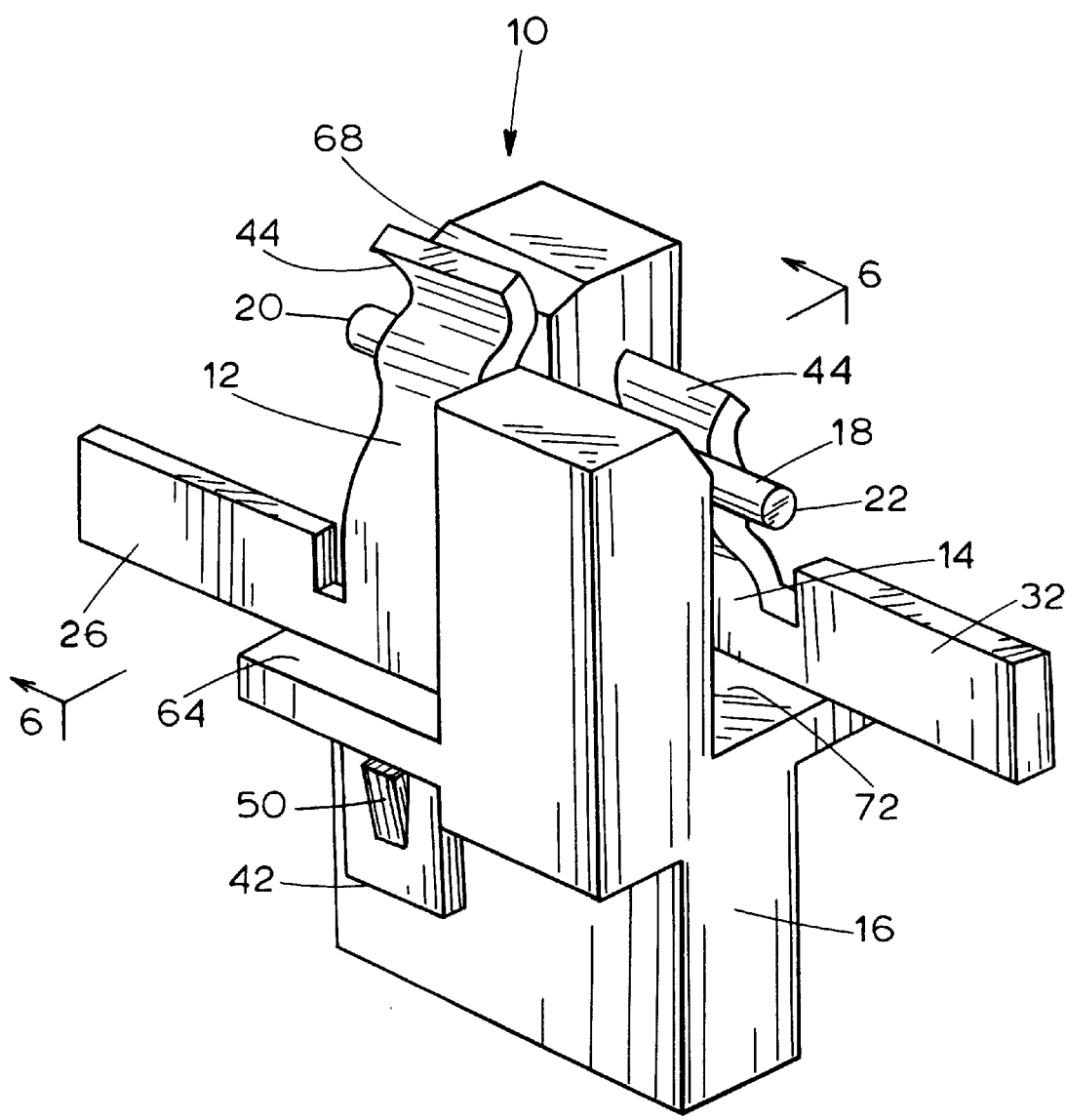
FIG. 2 is an enlarged isometric view illustrating the embodiment of the present invention shown in FIG. 1.

Illustrated in FIGS. 1 and 2 is a thermal protection apparatus 10 that embodies aspects of the present invention. The protection appartus 10 includes a first electrical contact 12 and a second electrical contact 14 spaced from the first contact 12 and secured to a carrier 16 as shown. The protection apparatus 10 further includes a fusible electrically conductive pin 18 that has a first end 20 engaged with the first contact 12 and a second end 22 engaged with the second contact 14, thereby providing an electrical path between the first and second contacts 12, 14. Preferably, a lead wire 24 from a power source (not shown) is secured to a connector portion 26 of the first contact 12, and a magnet wire 28 is connected between the winding of a motor 30 and a connector portion 32 of the second contact 14. Thus, the protection apparatus 10 is serially interposed in the path of power supplied to the winding of the motor 30. Also, preferably, the protection apparatus 10 is located so that it is responsive to the temperature of the windings of the motor 30. For example, the protection apparatus 10 may be located adjacent to the commutator portion of the motor 30 as shown in FIG. 1.

The material used for the pin 18 substantially determines the winding temperature at which the protection apparatus 10 will fuse (i.e., melt) and terminate operation of the motor. The pin 18 is preferably made of an electrically conductive thermally deformable material that fuses at a temperature that is below the maximum safe operating temperature for the windings of the motor 30. For example, a solder having a melting point of 255 ° F. provides adequate overload protection for a typical electric motor. A variety of solder compositions, other materials, or combinations of materials, providing different melting points, may be substituted to make the pin 18 without departing from the spirit of the invention.

The material and geometry of the pin 18 substantially determines the resistance of the protection apparatus 10 and the maximum amount of continuous current that the protection apparatus 10 can transfer to the windings of the motor 30 at a given ambient temperature. As is known in the art, the resistance of the pin 18 is directly proportional to the resistivity of the material used for the pin 18 and to its length, and is inversely proportional to its cross sectional area. Winding current passing through the resistance of the pin 18 internally heats the pin 18 and produces a self-heating offset that causes the temperature of the pin 18 to exceed the local ambient temperature. Thus, the pin 18 will fuse and terminate the operation of the motor 30 when the self-heating offset due to the winding current plus the local ambient temperature reaches the fusing temperature of the pin 18.

In accordance with the present invention, the geometry of pin 18 is preferably selected so that the self-heating offset is relatively small at maximum winding current (e.g., under locked rotor conditions). As a result, the fusing of the protection apparatus 10 is substantially determined by the local ambient temperature which is substantially determined by the actual winding temperature of the motor 30. Thus, the protection apparatus 10 will not improperly terminate operation of the motor 30 in response to transient currents or under load conditions that do not cause dangerously high winding temperatures. For example, due to the thermal mass of the motor 30, the protection apparatus 10 may allow the motor to operate at very high loads for short durations. Alternatively, the protection apparatus 10 may allow the motor 30 to operate at higher continuous duty loads when ambient temperature conditions permit.

Preferably, the pin 18 has a simple cylindrical or rectangular bar geometry and may be cut from continuous stock material to minimize costs. It may be desirable for some applications to employ more complex pin geometries that define more reliably and/or precisely where the pin 18 will fuse along its length. For example, the profile of the pin 18 may be tapered so that its smallest cross sectional area lies between the first and second contacts 12, 14.

Figure 3:
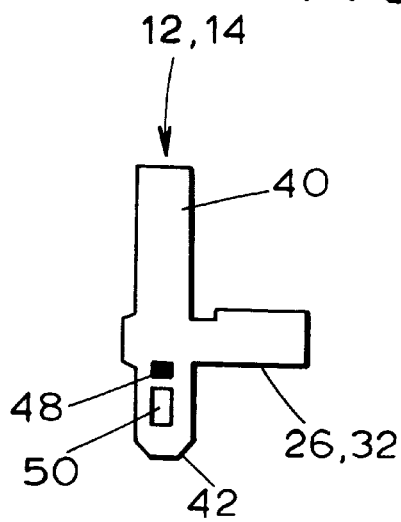
FIG. 3 is an elevational view of a face of an electrical contact that may be used with the embodiment shown in FIGS. 1 and 2.
Figure 4:
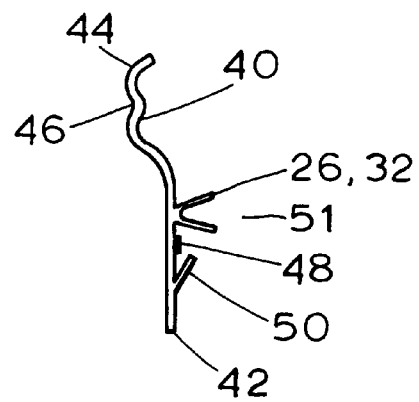
FIG. 4 is a further elevational view of a side of the electrical contact shown in FIG. 3.

Illustrated in FIGS. 3 and 4 are detailed views of the first and second contacts 12, 14 that may be used with the protection appartus 10 shown in FIGS. 1 and 2. The contacts 12, 14 are preferably made of brass or any other suitable electrical contact material and are preferably fabricated using stamping operations in a progressive die, for example, to minimize costs. In addition to the connector portions 26, 32, the contacts 12, 14 have a finger portion 40 and a mounting tab portion 42, all preferably arranged as shown. The finger portion 40 has a curvilinear profile that is best seen in FIG. 4. The finger portion 40 has a lead-in portion 44 that is bent away from a saddle-shaped portion 46. The saddle-shaped portion 46 preferably has a curvature or profile that accommodates the shape of the pin 18. The mounting tab 42 further includes a retaining dimple 48 and a retaining finger 50 that is bent outwardly as shown most clearly in FIG. 4. The dimple 48 and the retaining finger 50 may be formed directly from the material of the contacts 12,14 to minimize costs.

The connector portions 26, 32 of the contacts 12,14 may include a pair of ears 51 that can be folded to form a crimp-type connection for mechanically retaining and making electrical contact with the wires 24, 28. The connector portions 26, 32 may be insulation piercing types and/or may require soldering or welding of the wire ends into the connectors 26, 30. Alternatively, the ears 51 may be left unfolded so that each of the connector portions 26, 30 provide a spade connection that is configured to accept a standard female flag connector, which may be provided as terminations for the wires 24, 28. Those skilled in the art will recognize that a variety of known connector types may be substituted for the connector portions 26, 30 without departing from the scope of the invention.

Figure 5:
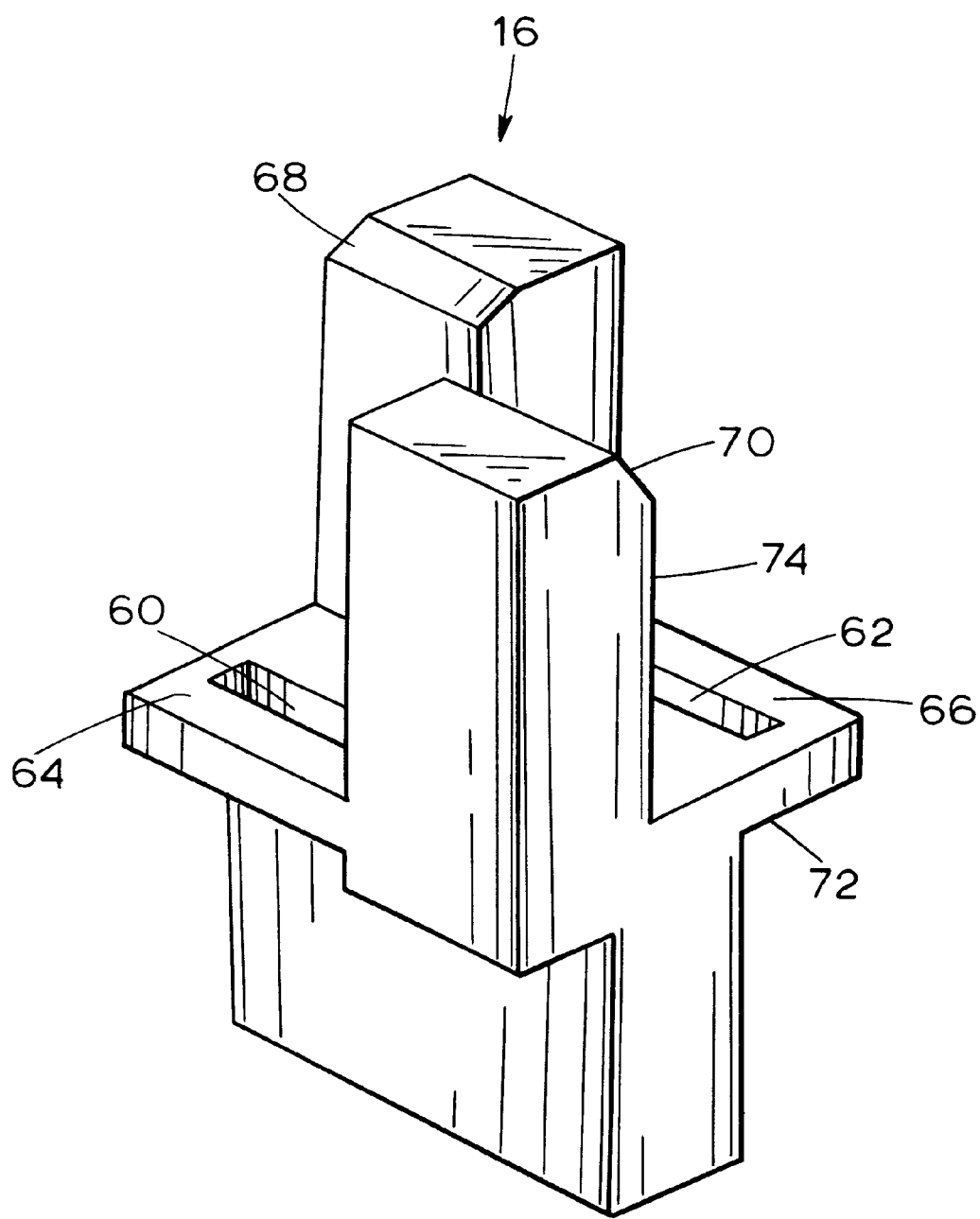
FIG. 5 is a perspective view of the carrier used with the embodiment shown in FIGS. 1, 2, and 6.

Illustrated in FIG. 5 is a more detailed perspective view of the carrier 16. The carrier 16 is preferably made of an electrically insulating material such as a thermoplastic. The carrier 16 includes slots 60, 62, shelf areas 64, 66, and lead-in chamfers 68, 70.

Figure 6:
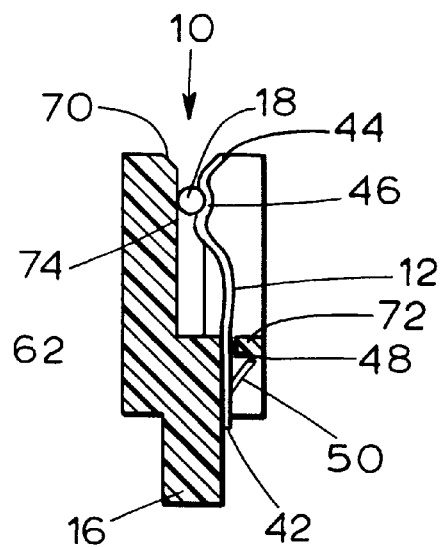
FIG. 6 is a sectional view taken generally along the line 5—5 that illustrates in more detail the electrical contact of FIGS. 3 and 4 as mounted in the embodiment shown in FIGS. 1 and 2.

FIG. 6 shows how the first contact 12 is secured to the carrier 16 and engages the pin 18. To secure the contact 12 to the carrier 16, the mounting tab 42 of the contact 12 is passed through the slot 62. The retaining finger 50 is deflected downwardly as it passes through the slot 62 and then returns to an undeflected state when the contact 12 is fully seated against the shelf area 66. In the undeflected state, the retaining finger 50 is stopped by the bottom surface 72 of the shelf area 66, thereby preventing subsequent removal of the contact 12 from the carrier 16. Additionally, the slot 60 is dimensioned to provide a press fit with the retaining dimple 48. This press fit provides mechanical stability and prevents undeisreable movement of the contact 12 that may result, for example, from vibrations in the motor 30.

The pin 18 is engaged with the saddle-shaped portion 46 of the contact 12 and is forced against a wall 74 of the carrier 16 by the contact 12. Those skilled in the art will recognize that the force applied by the contact 12 to the pin 18 can be varied through material parameter (e.g., stiffness) for the contact 12 and by the total deflection imparted to the finger portion 40 of the contact 12 when engaged with the pin 18 as compared to the relaxed contact geometry. The lead-in chamfer 70 is complementary to the lead-in portion 44 of the contact 12. The lead-in chamfer 70 and lead-in portion 44 facilitate insertion of the first end 20 of the pin 18 into the mounted position as shown. The second contact 14 is not shown in FIG. 6, but is similarly secured to the carrier 16 and similarly engages the second end 22 of the pin 18 (see FIG. 2). Many other details of the design of the carrier 16 are defined by the particular application (i.e., the particular design of the motor) and could be modified as needed by one of ordinary skill in the art to implement the present invention.

In operation, a thermal overload condition in the motor heats the pin 18 so that the pin fuses and permanently interrupts the flow of power to the windings of the motor 30. In preferred embodiments, the protection apparatus 10 is designed as a safety device for a one-time operation and is not field repairable/resettable, but it is envisioned that some applications may permit repair via replacement of the pin 18, for example.

Of course, it should be understood that a range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. A protection apparatus for an electric motor having a winding, comprising:

an electrically insulating carrier;

first and second electrical contacts spaced apart and secured to the carrier; and a fusible electrically conductive pin having a first end portion and a second end portion, wherein the first and second end portions are engaged with the contacts and at least one of the contacts forces the pin against the carrier, and wherein the pin is responsive to a temperature condition in the winding to cause the pin to fuse so that an electrical path between the contacts is interrupted.

2. The apparatus of claim 1, wherein the contacts are made substantially of brass.

3. The apparatus of claim 1, wherein the pin is made substantially of solder.

4. The apparatus of claim 1, wherein the contacts force the ends of the pin against the carrier.

5. The apparatus of claim 1, wherein the first contact is associated with a power lead wire and the second contact is associated with a magnet wire from the motor.

6. The apparatus of claim 1, wherein the temperature condition in the winding is a high winding temperature.

7. The apparatus of claim 1, wherein each of the contacts comprises:

a finger portion adapted to engage the pin;

a connector portion adapted to receive a lead wire termination; and a mounting tab portion adapted to secure the contacts to the carrier.

8. The apparatus of claim 7, wherein the finger portion further comprises a lead-in portion.

9. The apparatus of claim 7, wherein the finger portion further comprises a saddle-shaped portion that accommodates the shape of the pin.

10. The apparatus of claim 9, wherein the mounting tab portion further comprises a retaining finger and a retaining dimple, at least one of which is engaged with the carrier.

11. The apparatus of claim 7, wherein the connector portion provides a crimp type connection.

* * * * *